United States Patent [19]

Sloan

[11] Patent Number: 4,741,575
[45] Date of Patent: May 3, 1988

[54] PNEUMATICALLY ACTUATED DUMPING BIN

[76] Inventor: Curtis R. Sloan, 217 North Lehigh Ave., Munhall, Pa. 15121

[21] Appl. No.: 674,911

[22] Filed: Nov. 26, 1984

[51] Int. Cl.⁴ .......................... B60P 1/32; E06B 7/00
[52] U.S. Cl. ........................................ 298/12; 49/388; 298/1 A; 298/14; 414/477; 414/498; 414/522
[58] Field of Search .......................... 298/1 A, 12, 14; 414/498, 477, 479, 522; 296/53, 56, 184, 52; 49/463, 197, 388, 389

[56] References Cited

U.S. PATENT DOCUMENTS

| | | | |
|---|---|---|---|
| 1,780,775 | 11/1930 | Williams | 298/12 |
| 1,952,883 | 3/1934 | Nelson | 296/56 X |
| 2,608,727 | 9/1952 | Ball | 49/463 X |
| 3,022,111 | 2/1962 | Hutchinson | 298/14 |
| 3,630,571 | 12/1971 | Saldana | 298/1 A |
| 3,915,496 | 10/1975 | Mabry, Jr. | 298/14 |
| 4,084,708 | 4/1978 | Goodvin | 414/24.6 |
| 4,084,851 | 4/1978 | Duncan, Sr. | 298/14 |
| 4,478,005 | 10/1984 | Mundschenk | 49/388 |
| 4,627,780 | 12/1986 | Munz | 298/12 X |

FOREIGN PATENT DOCUMENTS

| | | | |
|---|---|---|---|
| 990762 | 6/1976 | Canada | 298/12 |
| 2452399 | 11/1980 | France | 298/12 |
| 131435 | 10/1981 | Japan | 414/477 |

*Primary Examiner*—Robert J. Spar
*Assistant Examiner*—Janice Krizek
*Attorney, Agent, or Firm*—Burns, Doane, Swecker & Mathis

[57] ABSTRACT

A pneumatically actuated dumping bin for a cargo bed of a vehicle includes a floor, a left side wall, a right side wall and a rear wall. The pneumatic piston and cylinder is pivotably connected only to the bin at the rear wall portion with the cylinder being substantially vertical when the bin is horizontal. Compressed air selectively actuates the piston and cylinder to raise the bin at the rear wall portion when the bin substantially overhangs a rear end of the vehicle.

27 Claims, 6 Drawing Sheets

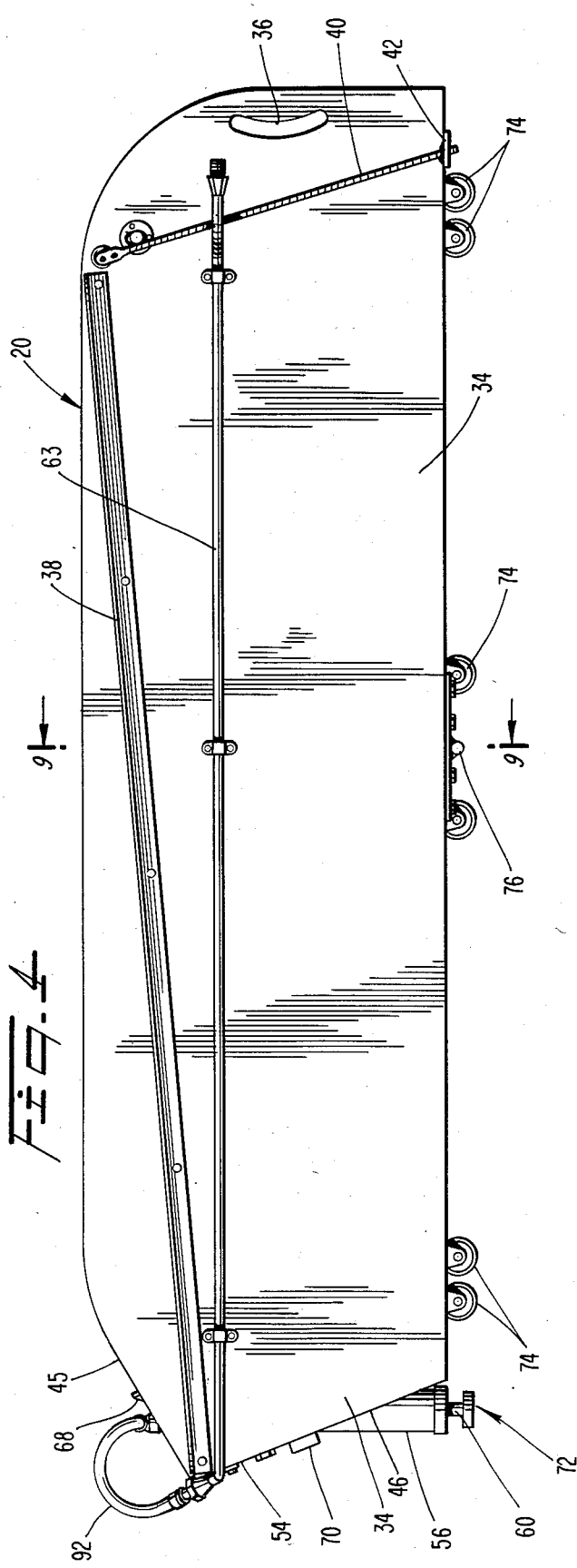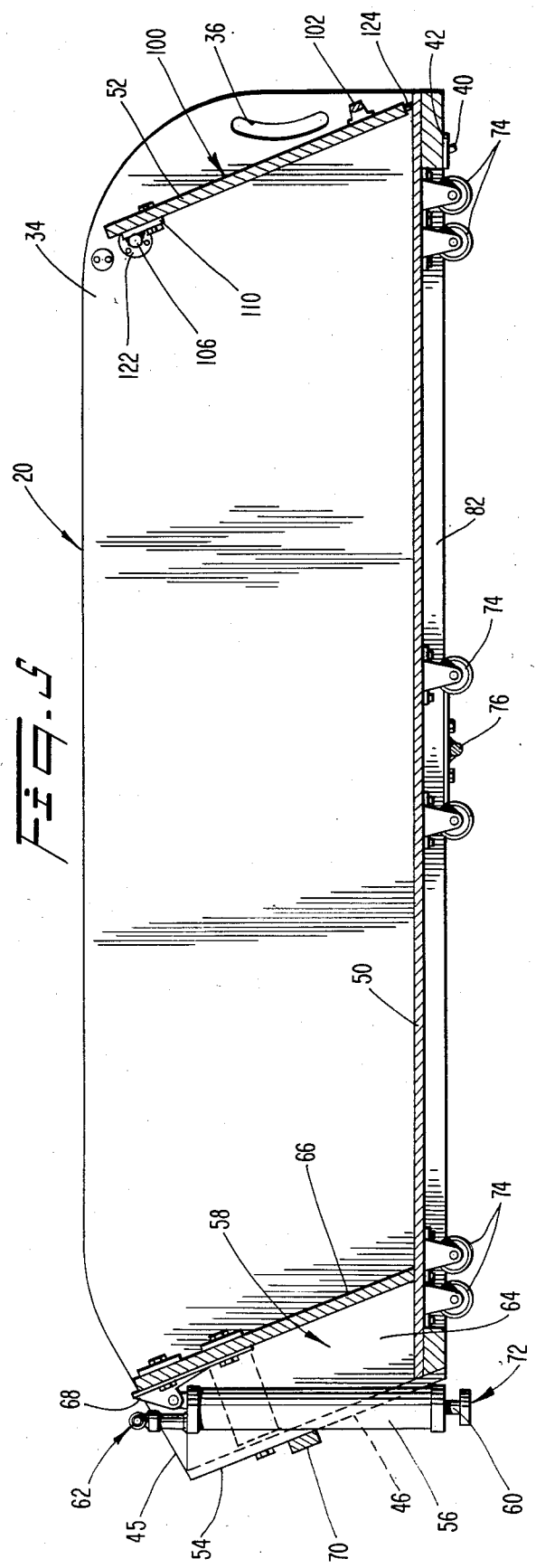

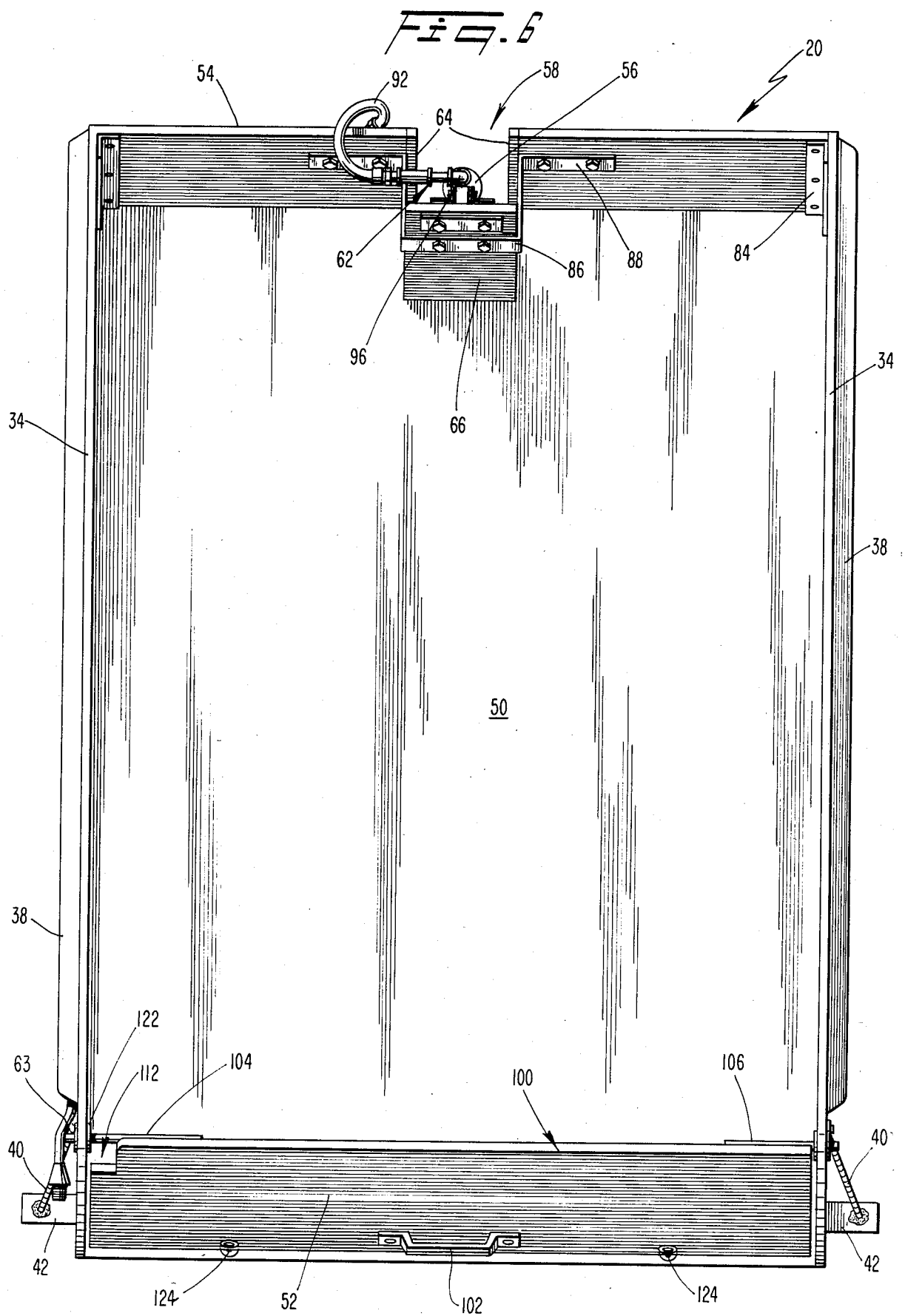

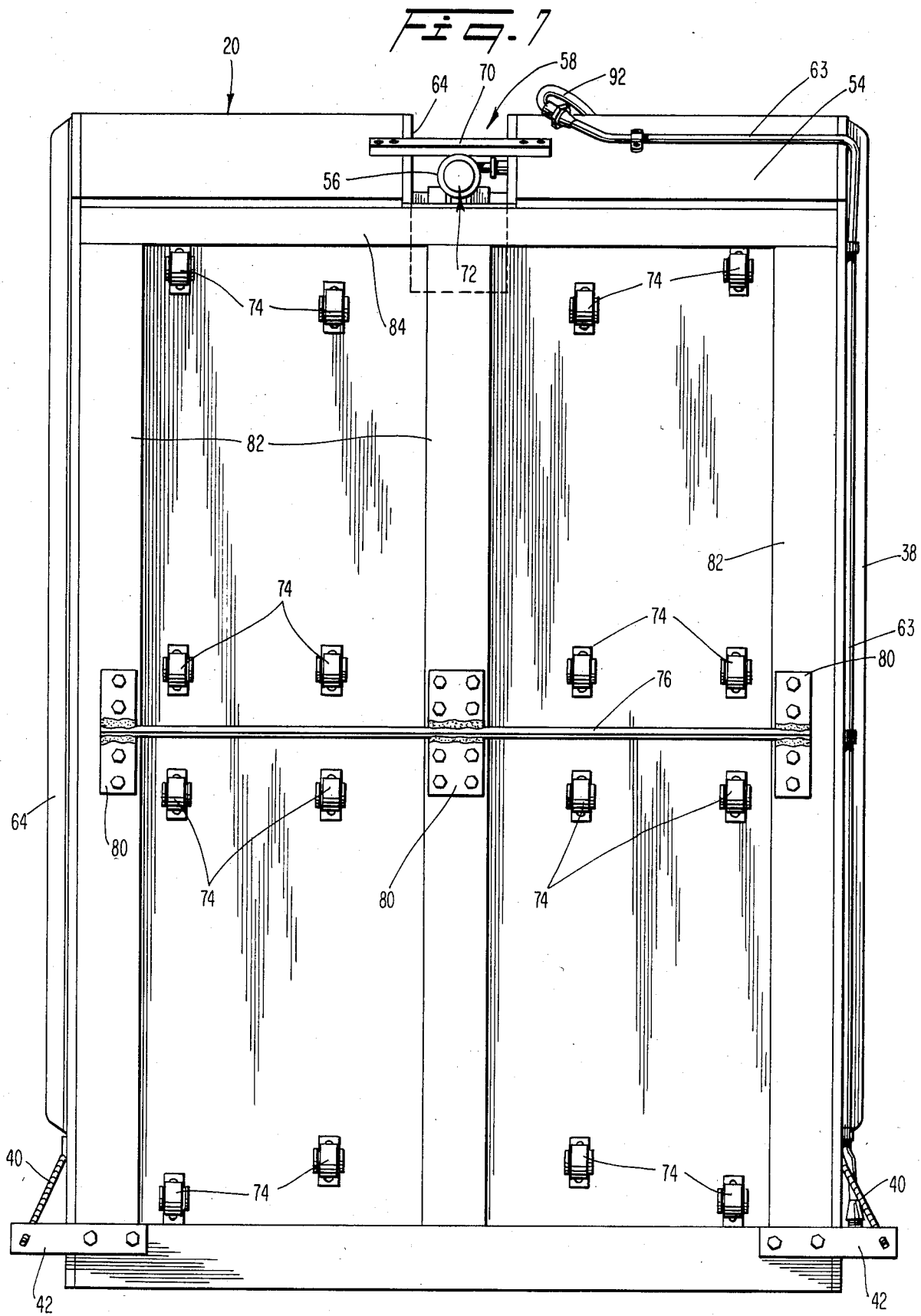

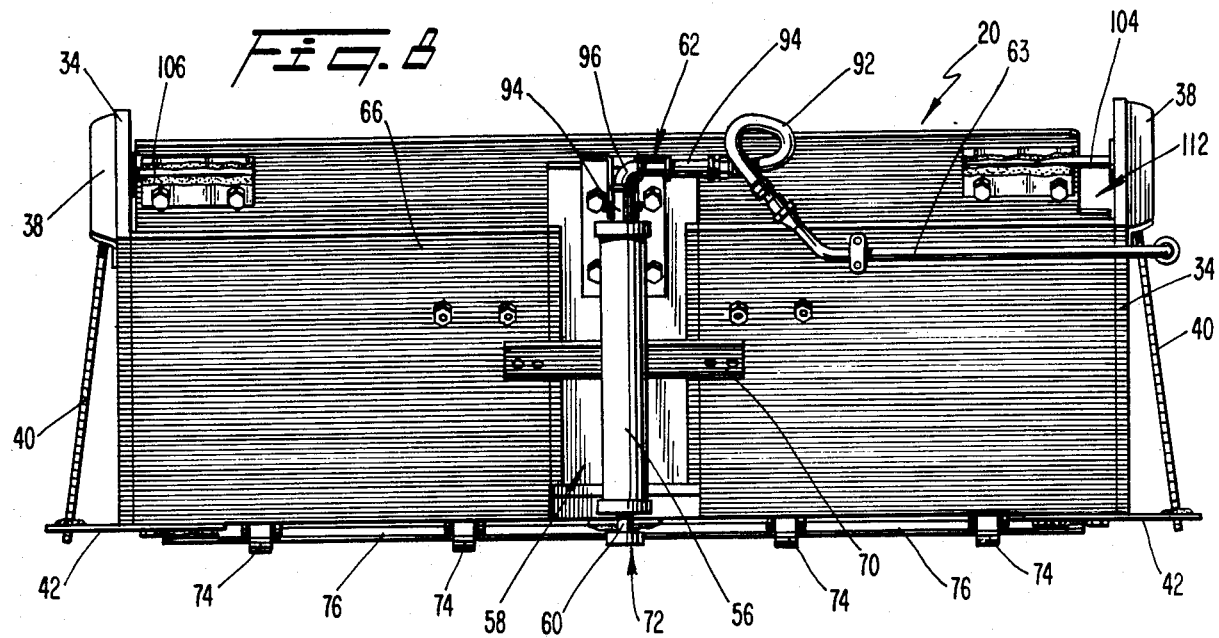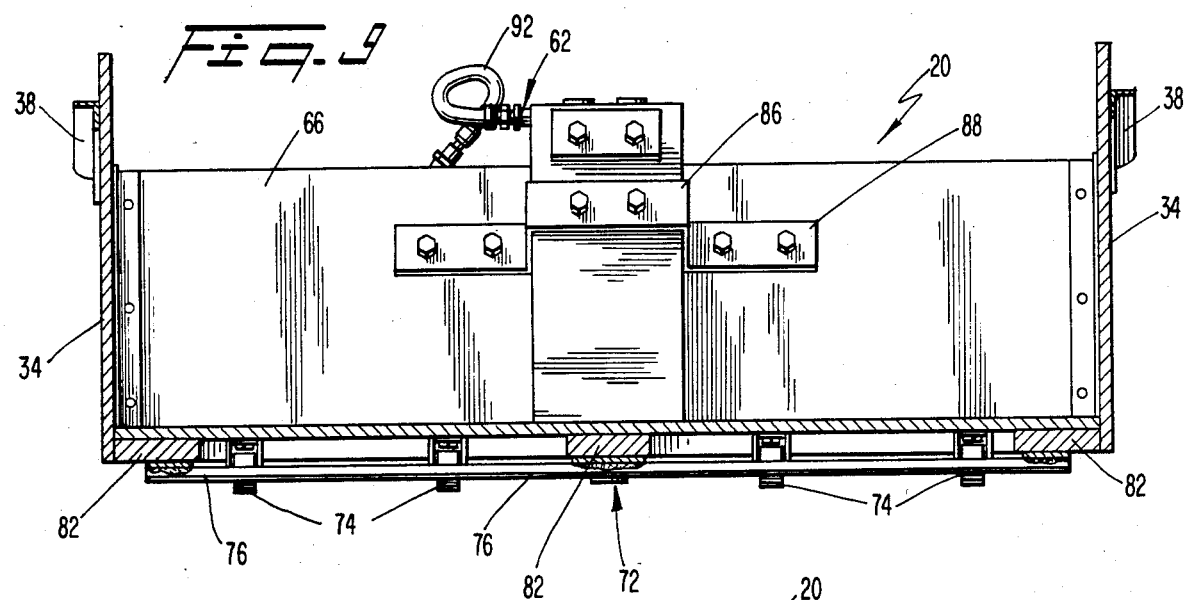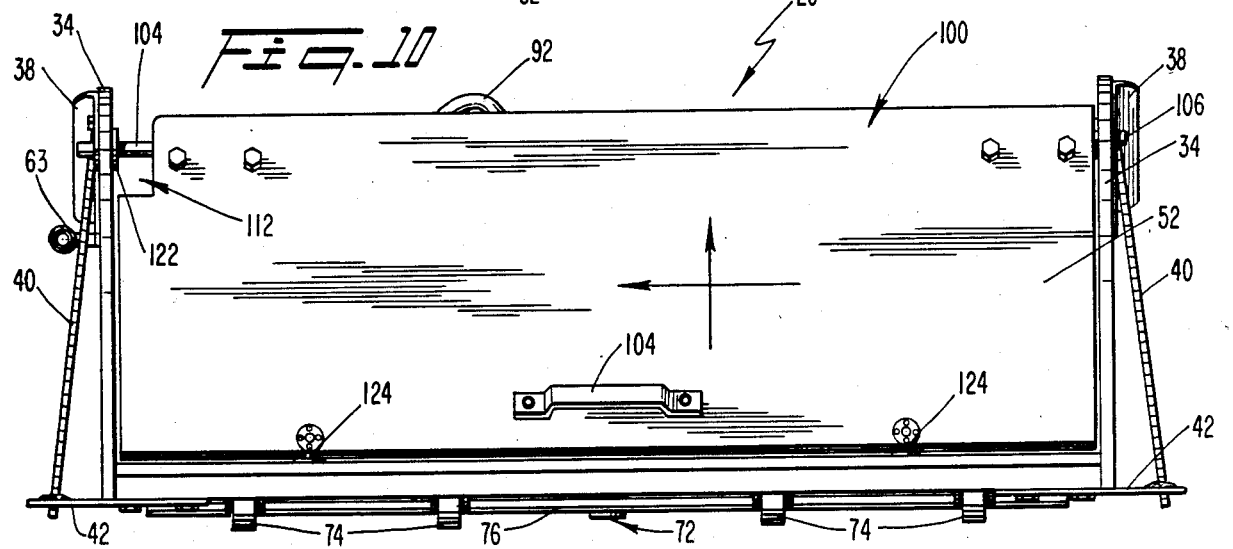

PNEUMATICALLY ACTUATED DUMPING BIN

BACKGROUND AND SUMMARY OF THE PRESENT INVENTION

The present invention relates generally to dumping bins for vehicles and more particularly relates to power-actuated dumping bins for pickup trucks.

Frequently, the owner of a pickup truck or other similar vehicle having a cargo bed wishes to load and transport a load of material for subsequent dumping at a remote location. Loose material such as dirt, sand, gravel and the like which has been loaded into the bed of the pickup truck must ordinarily be manually unloaded such as, for example, by the use of shovels. Such a manual unloading of loose material from a bed of a pickup truck is even more troublesome if the bed of the pickup truck has been provided with a roof or top such as is commercially available for a wide variety of pickup trucks.

Various arrangements are known in the art for providing an auxiliary dumping device for a vehicle such as a pickup truck. Each of the known devices, however, is undesirable for one or more reasons such as its undue complexity, expense or manner of operation.

In U.S. Pat. No. 3,630,571 of Saldana which issued on Dec. 28, 1971, an auxiliary dumping apparatus for a vehicle is disclosed. A chamber-defining container structure is slidably mounted on a container mounting and supporting frame which is received within the bed of the truck. The container structure is positioned in an extreme forward position for transport and may be moved to an extreme rearward preload-dumping position in which a substantial portion of the container structure extends beyond the rear end of the frame of the vehicle. In one embodiment of the Saldana device, a hydraulic cylinder is provided for assisting the dump actuation of the container structure. The Saldana device, however, is relatively complex and expensive since a relatively large hydraulic cylinder is connected to both the vehicle and to the container.

In U.S. Pat. No. 3,915,496, of Mabry which issued on Oct. 28, 1975, a dumping mechanism for a vehicle is disclosed including a moveable body which is provided with a manually operated jack mechanism for selectively tilting the body. The Mabry device, however, is relatively cumbersome and inconvenient for use especially if the bed of the pickup truck is provided with a top or roof.

Yet still another dumping device for a pickup truck is disclosed in U.S. Pat. No. 4,084,851 of Duncan which issued on Apr. 18, 1978. The Duncan arrangement is again relatively complex and expensive in its configuration.

Accordingly, the need still remains for a relatively inexpensive and uncomplicated dumping bin for a pickup truck which is power assisted so as to facilitate a dumping operation.

It is an object of the present invention to provide a dumping bin for a pickup truck which is pneumatically powered.

Still another object of the present invention is to provide a dumping bin for a pickup truck which is relatively inexpensive and uncomplicated in operation.

Yet still another object of the present invention is to provide a dumping bin which is suitable for use in the cargo bed of a pickup truck which has been provided with a roof or top.

Still another object of the present invention is to provide a dumping bin for a pickup truck which requires a minimum of modification to the bed and structure of the pickup truck while still providing a safe and reliable powered operation of the dumping bin.

These and other objects of the present invention are achieved by a pneumatically actuated dumping bin for a cargo bed of a vehicle according to the present invention. The dumping bin includes a floor portion, a left side wall portion, a right side wall portion and a rear wall portion with the bin being adapted to be received within the cargo bed of the vehicle for selective movement between a first travel position and a second dumping position. A pneumatic piston and cylinder is provided with the cylinder being pivotably connected to the bin adjacent the rear wall portion of the bin and with the cylinder being substantially vertical when the bin is horizontal. Compressed air is provided for selectively actuating the pneumatic piston and cylinder to raise the bin at the rear wall portion when the bin is in the second dumping position. A plurality of wheels are mounted on the underside of the bin to facilitate the selective movement of the bin between the first travel position and the second dumping position.

BRIEF DESCRIPTION OF THE DRAWINGS

A preferred embodiment of the present invention will be described with reference to the accompanying drawings wherein like reference numbers indicate like members and wherein:

FIG. 4 is a side view of the pneumatically actuated dumping bin according to the present invention;

FIG. 5 is a cross sectional view of the bin of FIG. 4;

FIG. 6 is a top view of the bin of FIG. 4;

FIG. 7 is a bottom view of the bin of FIG. 4;

FIG. 8 is a rear end view of the bin of FIG. 4;

FIG. 9 is a view through the line 9—9 of FIG. 4;

FIG. 10 is a front end view of the bin of FIG. 4;

DETAILED DESCRIPTION OF THE PREFERRED EMBODIMENT

Figure 1:
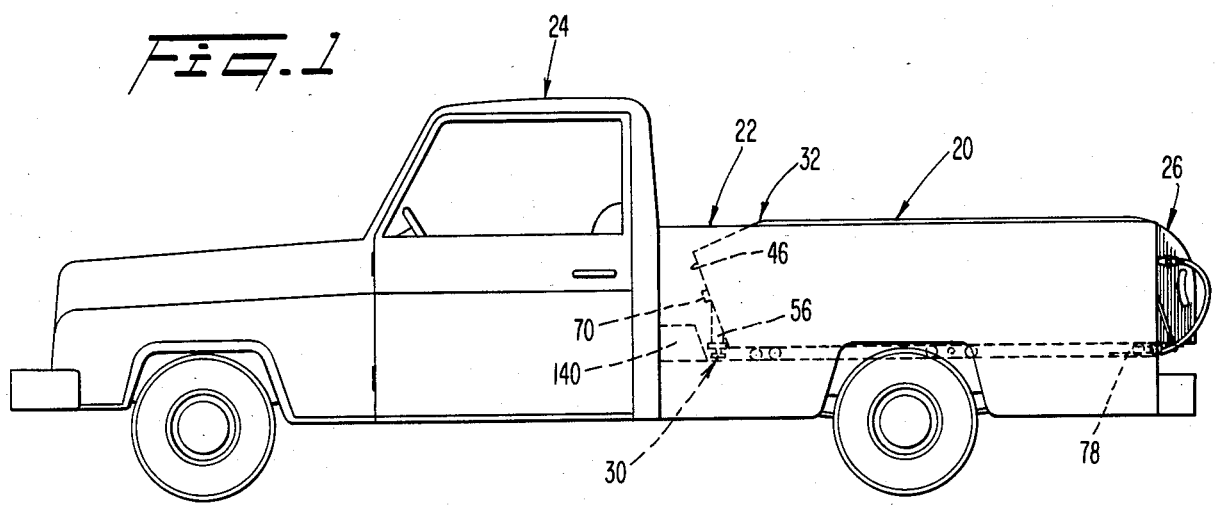
FIG. 1 is a side view of a pickup truck including a pneumatically actuated dumping bin according to the present invention.

With reference to FIG. 1, a pneumatically actuated dumping bin 20 according to the present invention is provided in the cargo bed 22 of a pickup truck 24. The pickup truck 24 is of suitable conventional configuration and may comprise any of a wide variety of vehicles having a cargo bed 22 or the equivalent thereof. In this way, the pneumatically actuated dumping bin according to the present invention is also suitable for use in other vehicles such as, for example, a station wagon or van, if desired. For purposes of discussion, however, the pneumatically actuated dumping bin according to the present invention will be described with reference to the bed of a pickup truck.

The bin 20 is adapted so as to be received either completely or substantially completely within the bed 22 of the pickup truck 24 in a first travel position (FIG. 1). In this way, when the bin is empty or provided with a load of cargo, the pickup truck may then be driven to a desired location for dumping. Depending upon the configuration of the pickup truck and the bin 20, a tailgate (not shown) for the pickup truck 24 may be removed, closed, or left open during the transport of the bin in the pickup truck. If the tailgate is not closed, however, a suitable locking mechanism (not shown) should be provided so as to maintain the bin 20 in the bed 22 during movement of the truck 24. Such a locking mechanism may comprise a removable chain or bar provided across the end of the bed 22 or may comprise a latching device of suitable conventional design such as will be readily apparent to one skilled in the art upon reading the detailed description of the preferred embodiment of the present invention.

Figure 2:
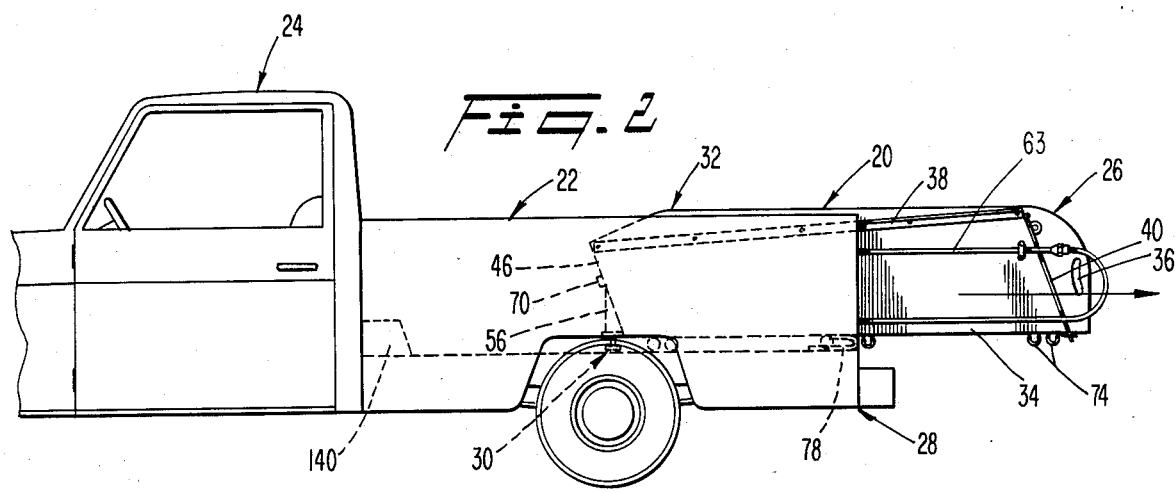
FIG. 2 is a side view of the pickup truck of FIG. 1 with the pneumatically actuated dumping bin moved rearwardly in the bed of the pickup truck.
Figure 3:
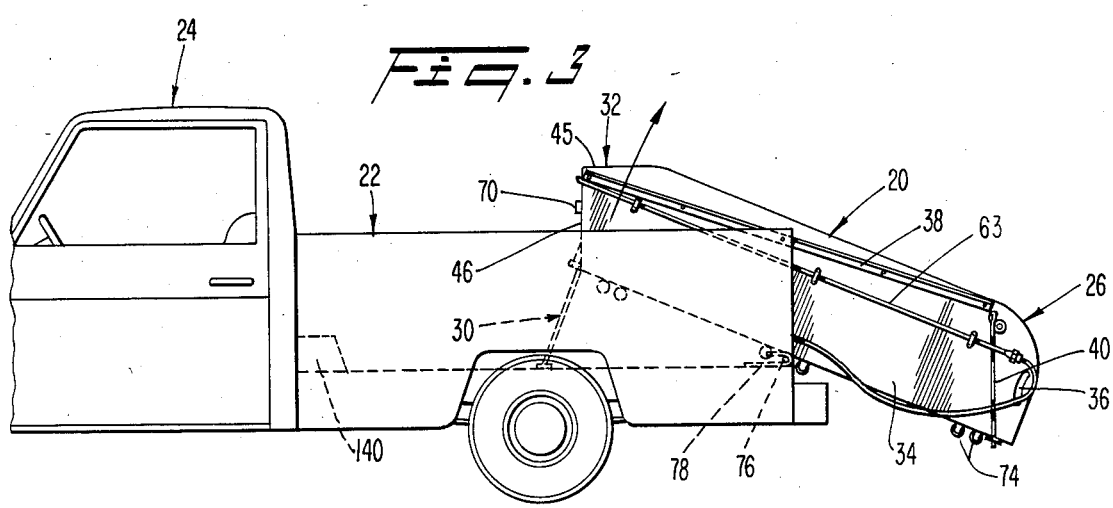
FIG. 3 is a side view of the pickup truck of FIG. 1 with the bin of the present invention in a dumping configuration.

With reference now to FIG. 2, after the truck has been moved to the dumping location, the bin 20 is urged rearwardly within the bed 22 until a front end 26 of the bin substantially overhangs a rear end 28 of the bed 22 in a second dumping position (FIG. 2 and FIG. 3). At this time, a pneumatic cylinder and piston 30 which is provided at a rear end of the bin 20 is actuated so as to raise the rear end 32 of the bin 20. In this way, with reference to FIG. 3, the bin 22 is pivoted about a midsection of the bin to dump the cargo of the bin as desired.

After the cargo of the bin 20 has been dumped, the piston and cylinder is vented to allow the rear end of the bin 20 to lower and the bin may once again be urged forwardly within the bed 22 of the pickup truck. At this time, the bin can either be transported to another location or can be filled with new cargo for subsequent dumping.

With reference now to FIG. 4, the dumping bin 20 includes right and left side wall portions 34 which are each rounded at the forward top end of the side wall portion as desired. The right and left side wall portions of the bin are identical in shape and structure and will be discussed together. Each side wall portion 34 may be provided with a handle 36 at the forward end of the side wall portion so as to facilitate a manual pulling of the bin 20 from the first travel position in the bed 22 of the pickup truck to the second dumping position. Each handle 36 may comprise a curved passageway which is removed from the side wall portion so as to permit the operator to grasp the side wall portion with his hand.

In order to provide structural support for the bin 20, one or more suitable bracing members 38 may be provided along each side wall portion 34. The support members 38 may each comprise a right angle piece of metal such as steel which is fastened at regular intervals to the side wall portion 34. Additional support members 40 may be provided as desired in order to strengthen the front end of the bin 20. The additional support members 40 may include metal rods which are attached at one end to the forward upper most corner of the side wall portion 34 and are attached at the other end to a bar 42 which is fastened to a floor portion of the bin 20.

With reference to FIG. 8, the additional support members 40 preferably each form a triangle with the respective side wall member 34 and the support bar 42.

As will be discussed in more detail subsequently, the rearward end of each side wall portion 34 is pointed with the upper portion of the rear end of the side wall portion oriented downwardly and the lower portion of the side wall urged steeply upwardly so as to form a right angle.

With reference again to FIG. 3, when the bin is in the dumping position, with the rearward end of the dumping bin raised, the rearwardmost portion 45 of the upper edge of the side wall portion 34 is oriented horizontally and the rearwardmost end edge 46 of the side wall portion 34 is oriented vertically. In this way, the bin 20 according to the present invention can be raised sufficiently to dump its cargo without abutting a top or cover for the bed 22.

With reference to FIG. 5, the bin 20 also includes a floor portion 50 with the right and left side wall portions 34 being oriented at right angles with respect to the floor portion 50. At a forward end of the bin, a gate member 52 is provided which gate member is pivotably connected to the side wall portions at the uppermost end of the gate member 52.

At the rearwardmost end of the side wall portions, a rear wall portion 54 is provided which extends along the edge 46 of the side wall portions.

A pneumatic cylinder 56 is provided within a recess 58 of the rear wall portion 54. The pneumatic cylinder 56 includes a piston 60 which can be selectively urged downwardly relative to the cylinder 56 upon the supply of sufficient compressed air through a passageway 62. With reference again to FIG. 4, the supply of compressed air is preferably made through a suitable conduit 63 which is provided along one of the side walls 34 of the bin 20.

The recess 58 of the rear wall portion 54 is formed by right and left side portions 64 (see also FIG. 7) which are joined together by a middle portion 66. The end portion 66 abuts the floor 50 at an obtuse angle which obtuse angle is identical to the obtuse angle formed by the rear wall portion 54 with the floor 50. A bracket 68 is bolted to the middle portion 66 of the recess at an uppermost end of the portion 66. An upper end of the cylinder 56 is in turn pivotably connected to the bin at the bracket 68.

The pivotal connection of the cylinder 56 to the bracket 68 is such that the cylinder may extend vertically downwardly when the bin 20 is oriented horizontally. When the piston 60 has been extended, the cylinder may pivot closer to the portion 66 (see also FIG. 3) by reason of the angled orientation of the wall portion 66 with respect to the floor 50 of the bin. Preferably, the pivotal connection of the bracket 68 with the cylinder 56 is such that the cylinder is confined to movement between the vertical orientation of FIG. 5 and an orientation which is parallel with the panel 66. Movement of the cylinder 56 away from the portion 66 beyond a vertical configuration when the bin is horizontal may be prevented by a suitable configuration of the bracket 68 in a manner readily apparent to one skilled in the art upon reading the present disclosure or may be provided, for example, by way of a bar 70 (see FIG. 14) provided across the recess 58 at a suitable position on the rear wall portion 54. The bar 70 restricts the movement of the cylinder 56 away from the middle portion 66 so as not to exceed the vertical orientation of the cylinder 56 when the bin 20 is horizontal.

In the present invention, only a relatively small piston and cylinder is required in order to raise the rear end of the bin to a dumping position. This is because the piston and cylinder hangs freely downwardly from the bracket 68 and the piston is not connected at its lower end to the bed of the vehicle. Since the bin is roughly balanced about a mid-point during dumping (see FIG. 3), the piston and cylinder is effectively raising only a fraction of the weight of the bin and its load of material. Thus a substantial reduction in cost and complexity is achieved by reason of the particular configuration of the piston and cylinder with respect to the bin of the present invention.

Moreover, since the cylinder 56 is prevented from moving away from the portion 66 unduly, it is not required nor is it normally desired that the piston 60 be fixedly attached to the bed of the pickup truck when the bin 20 is actually being dumped. Accordingly, the extent of modification which is required to the bed of the pickup truck and the complexity of the dumping mechanism is significantly reduced by way of the present invention.

In the preferred embodiment, the piston 60 is provided with a suitable pad 72 at the lowermost end of the piston which will frictionally engage the bed of the pickup truck. In normal operation, the frictional engagement of the pad 72 with the bed of the pickup truck is sufficient to prevent the cylinder 56 from moving unduly away from the panel 66 and the need for the bar 70 or equivalent structure is eliminated. When the bin is being moved between the first travel position and the second dumping position, the piston preferably does not frictionally engage the bed (see FIG. 1).

So as to facilitate the translational movement of the bin 20 in the bed 22, the bin 20 is provided with a plurality of wheels 74. The wheels 74 are preferably provided on the underside of the bin 20 beneath the floor portion 50. With reference to FIG. 7, the wheels 74 are arranged in a series of rows about the underside of the bin 22. A first row of wheels is provided adjacent the front end of the bin with another row of wheels provided adjacent the rear end of the bin. Third and fourth rows of wheels are preferably provided on either side of a bar member 76 which is securely fastened to the underside of the bin 20. The wheels 74 may be of any suitable configuration and are configured so as to freely carry the expected maximum combined weight of the bin and its cargo. Preferably, the wheels 74 comprise casters having either ball bearings or roller bearings so as to reduce friction between the bin and the bed of the pickup truck.

Figure 11:
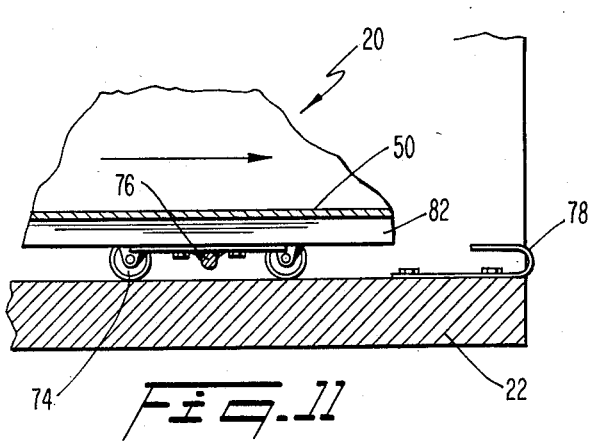
FIG. 11 is a partial cross sectional view of a portion of the bin on the bed of the pickup truck moving rearwardly toward a hook member provided on the bed of the pickup truck.
Figure 12:
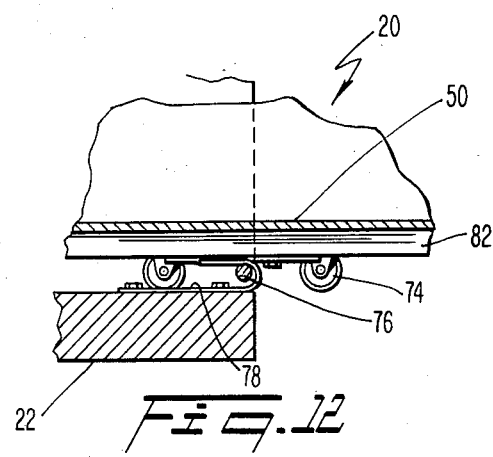
FIG. 12 is a side view in partial cross section showing a portion of the bin received by the hook member of the bed of the pickup truck.

With reference to FIG. 11 and FIG. 12, a pair of hook members 78 are fastened to the bed 22 of the pickup truck so as to securely engage the bar member 76 when the bin 20 is pulled rearwardly out of the bed 22. The hook members 78 are positioned on either side of a longitudinal midsection of the bed 22 so as not to engage the wheels 74 during the translational movement of the bin 20 in the bed 22. The hook members 78, however, are positioned so as to receive the rod member 76 when the bin 20 is at its normal rearwardmost position in the bed 22 which is the second dumping position for the bin. Preferably, the hook members 78 are positioned so that a curved portion of each hook member is located at the forwardmost end of the bed 22 to provide a sliding frictional pivot for the bin 20. With reference again to FIGS. 1-3, when the rod member 76 has been received by the hook members 78, the pneumatically actuated piston and cylinder can be supplied with compressed air so as to urge the rearward end of the bin upwardly and dump the cargo of the bin. Subsequently, the piston and cylinder can be lowered and the bin again urged forwardly in the bed 22.

In order to completely remove the bin 20 from the bed of the pickup truck, the bin 20 need only be raised sufficiently so that the rod member 76 does not engage the hook member 78 while the bin 20 is pulled out of the bed 22.

With reference again to FIG. 7, the rod member 76 is preferably positioned slightly closer to the front portion of the bin 20 so that the weight of the bin will initially maintain the bin in a horizontal configuration in the bed of the truck when the rod member 76 is engaged by the hook members 78. For example, a suitable position of the rod member on the underside of the bin would have a weight distribution of the bin approximately 45% forward of the rod member and 55% rearward of the rod member. Other proportional distributions of weight will be readily obvious to one skilled in the art upon reading the present disclosure.

The rod member 76 can be reliably fastened to the underside of the bin 20, for example, by welding the member 76 to bracket members 80 which have been bolted to the underside of the floor 50. A sufficient spacing must be provided between the rod member 76 and the underside of the bin so as to permit the hook members 78 to pass between the rod and the underside of the bin. As will be readily obvious to one skilled in the art, the bin 20 can be made out of any of a wide variety of materials such as, for example, wood, metal or plastic. If configured of plastic, the floor portion, right side wall portion, left side wall portion, and rear panel portion can be of unitary construction and may, for example, be injection molded. Suitable support ribbing (not shown) can be provided in the underside of the bin to provide additional support if the bin is of a plastic material. If the bin is constructed of wood as in the embodiment illlustrated herein, additional support may be provided for the underside of the bin through the use of support boards 82 running longitudinally of the floor 50. Additional support boards 84 may also be provided at either end of the floor portion 50.

With reference now to FIG. 6, the rear wall portion 54 may be connected to the right and left side wall portions 34 by suitable support members 84 of metal. The support members 84 may then be suitably bolted to the rear wall portion and side wall portion as appropriate. In order to provide additional strength for the recess 58 of the rear wall portion, a support bracket 86 comprised of a U-shaped strip of metal having right and left flange portions 88 may be provided. The flange portions 88 are secured to the rear wall portion 54 such as by bolts with the U-shaped portion suitably fastened to the recess 58 at the middle portion 66.

With reference now to FIG. 8, the pneumatic cylinder 56 is preferably connected to the compressed air supply line 63 by way of a flexible hose 92. In this way, the pivotal movement of the cylinder 56 relative to the bin 20 is not restricted by reason of the compressed air supply line 63.

With reference to FIG. 9, and also to FIG. 4, the flexible supply line 92 is shown as extending above the uppermost portion of the rear wall portion 54. If the bin according to the present invention is to be utilized with a pickup truck having a cab or top provided over the bed 22, it is preferred that the cylinder 56 and flexible hose 92 not extend above the uppermost portion of the rear wall portion 54. In such a desired configuration, the flexible hose 92 can be connected to the cylinder 56 at a side port (not shown) instead of at a top port 94 as in the illustrated embodiment. As shown in FIG. 8, the top port 94 of the cylinder 56 is provided with an elbow 96 and a conduit 98 which is connected to the flexible hose 92. Alternatively, a cylinder and piston having a shorter height can be utilized, if desired, and positioned lower on the wall portion 66 so as not to extend unduly above the uppermost portion of the rear wall portion 66.

Referring now to FIG. 10, the bin 20 is preferably provided with a gate member 100 at the front end of the bin 20. The gate member 100 includes a handle 102 which is provided at the bottom edge of the gate member 100 so as to facilitate the manual raising of the gate member 100.

With reference also to FIG. 5, left and right pin members 104, 106 are provided at the uppermost edge of the gate member 100 so as to pivotably mount the gate member 100 between the left and right side wall portions 34 of the bin. The first and second pin members 104, 106 may be welded to bar members 108, 110 which are in turn bolted to the gate member 100. The left and right pin members 104, 106 extend sufficiently beyond the left and right edges of the gate member 100 so as to securely maintain the gate member 100 between the side wall portions 34 of the bin.

In order to remove the gate member 100, a notch or recess 112 has been removed from the gate member 100 so that the left and right pin members may be disengaged from the side wall portions 34 of the bin. The recess 112 permits the gate member 100 to be urged laterally with respect to the bin when the gate member 100 has been raised substantially relative to the bin 20. The recess 112 permits the gate member 100 to be urged to the left until the right pin member 106 becomes disengaged from the right side wall 34 of the bin. The passageway of an annular member 122 which receives the left pin member 104 is sufficiently large so as to permit the gate member to be angled relative to the bin and then urged to the right to disengage the left pin member from the left side wall 34.

If desired, suitable gate latching mechanisms 124 can be provided to fasten the lowermost edge of the gate member 100 to the floor portion 50 of the bin.

Figure 13:
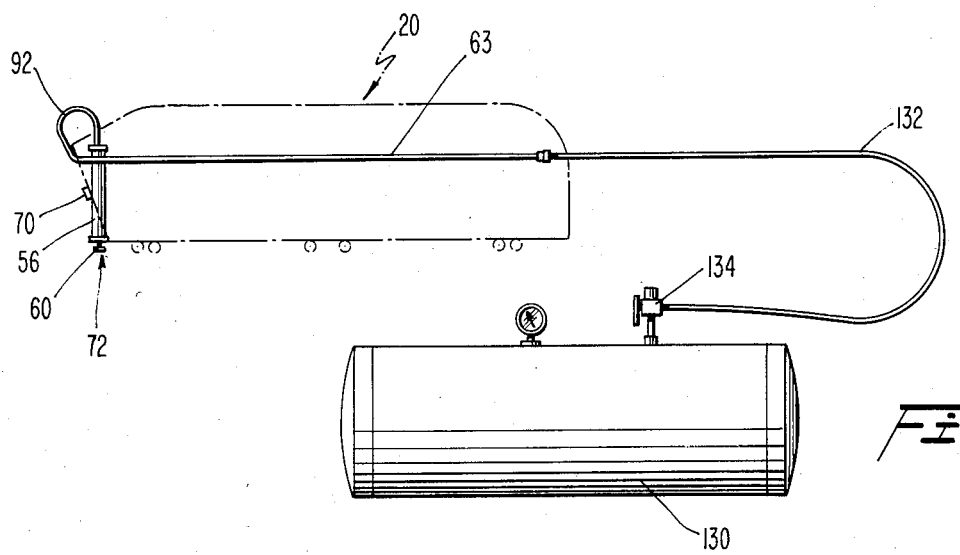
FIG. 13 is a schematic illustration of the pneumatically actuated dumping bin according to the present invention including a tank of compressed air.

With reference now to FIG. 13, the pneumatic cylinder 56 can be provided with a sufficient quantity of compressed air by means of a tank 130 which is connected to the compressed air supply line 63 by way of a suitable conduit 132. A valve 134 permits the selective actuation of the pneumatic piston and cylinder as desired. Although the quantity of compressed air and pressure needed in order to raise the rearward end of the bin will, of course, depend upon the particular size and type of piston and cylinder utilized along with the weight of the bin and the weight and distribution of the cargo within the bin, it has been determined that a compressed air pressure of 120 psi or less is sufficient for most applications. Likewise, in order to dump the cargo within the bin, the piston and cylinder need not raise the rearward end of the bin excessively and an elevation of approximately 30 degrees above the horizontal is generally sufficient for most cargo.

Figure 14:
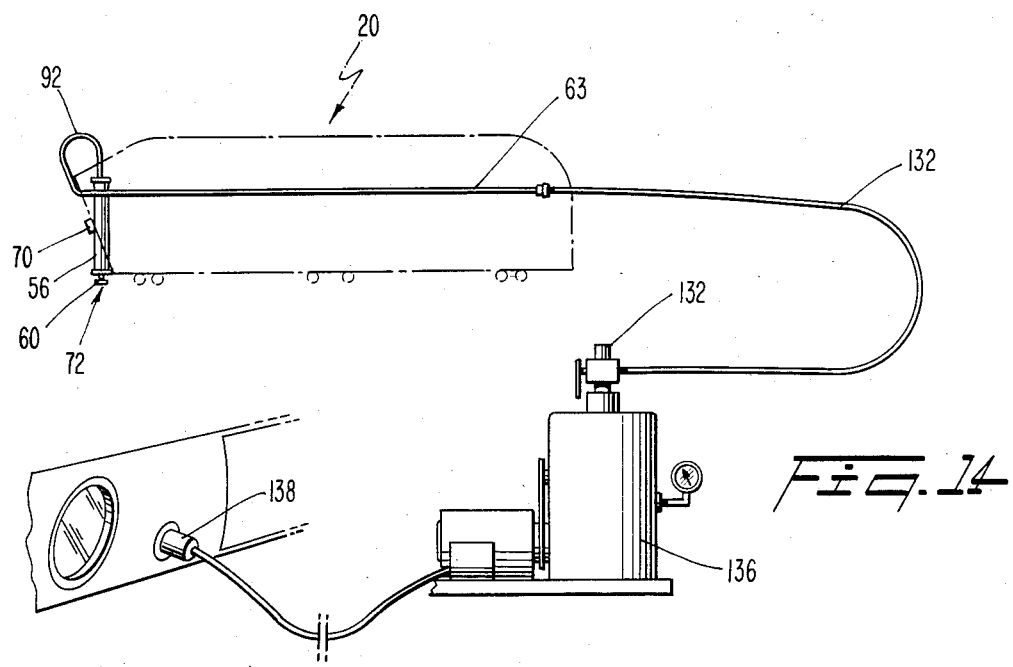
FIG. 14 is a schematic illustration of the pneumatically actuated dumping bin according to the present invention including an electrically powered air compressor.

With reference to FIG. 14, a preferred embodiment of the present invention is disclosed wherein the compressed air is supplied to the pneumatic piston and cylinder by way of an electrically operated air compressor 136. Relatively inexpensive air compressors which are readily powered by a standard 12 volt car battery through the cigarette lighter 138 are commercially available. Such air compressors are inexpensive and provide sufficient compressed air at a pressure and volume sufficient to actuate the pneumatic cylinder of the present invention.

Depending upon the characteristics of the pneumatic cylinder and piston, and depending upon the weight distribution of the bin about the rod member 72, the bin 20 may not automatically return to the horizontal configuration by reason of gravity even after the supply of compressed air to the pneumatic cylinder has been vented. In this event, the front end of the now empty bin need only be urged upwardly by hand to return the bin to a horizontal configuration. If desired, however, the pneumatic cylinder could be replaced with a double acting cylinder (not shown) so that the supply of compressed air can be utilized to return the bin 20 to a horizontal configuration. In such event, it may be desired or necessary to provide a catch for the pad 72 of the piston 60 so as to latchingly engage the piston 60 to the bed of the pickup truck. Such a catch (not shown) would comprise, for example, a U-shaped bracket or hook member which overlies the pad 72 of the piston 60 when the bin is in the second dump position.

With reference again to FIG. 1, if desired, suitable stops 140 which consist of wood blocks having an end surface angled so as to correspond to the orientation of the rear panel 56 can be provided in the bed of the truck so as to limit the forward movement of the bin 20 in the bed 22. The blocks 140 need not be fastened in any manner to the bed 22 of the pickup truck and are provided merely to prevent the rear end of the bin 20 from unintentionally abutting the rear end of the bed 22. If the bin had sufficient momentum when the bin engaged the blocks, the shape of the blocks 140, by reason of the angular orientation of the rear wall portion 56, would cause an upward sliding motion of the bin 20 on the blocks 140. In this way, the blocks 140 would urge the rearward end of the bin 20 upwardly if the bin 20 engages the blocks 140 with sufficient momentum. Accordingly, the horizontal translational momentum of the bin 20 is thereby transferred into a vertical movement of the rearward end of the bin while in a frictionally engaged sliding contact with the blocks 140. Alternatively, other impact absorption mechanisms, readily apparent to one skilled in the art, could be provided for the bin if desired.

By the present invention, a relatively simple and economical dumping bin which is pneumatically actuated has been provided for the bed of a vehicle. The dumping bin according to the present invention requires a minimum of modification to the bed of a pickup truck and likewise requires only a relatively inexpensive and small piston and cylinder since the piston is not attached to the bed of the pickup truck in normal operation. Since the cylinder and piston are carried with the bin during its translational movement from the first travel position to the second dumping position, a highly efficient and economical arrangement is provided.

In operation, the bin 20 according to the present invention is provided within the bed 22 of a pickup truck or similarly configured vehicle. The bin 20 is initially urged forwardly in the bed 22 to a first travel position with the bin 20 completely or substantially completely received within the bed 22 of the pickup truck. As desired, the bin 20 is then provided with a cargo to be subsequently dumped. When the vehicle and bin with its cargo have been transported to the dumping location, the bin 20 is pulled rearwardly of the pickup truck until the front end of the bin extends substantially beyond the rearwardmost end of the pickup truck. At this time, the bin is securely engaged by a suitable catch mechanism fastened to the bed of the pickup truck so as to limit the rearward motion of the bin 20 in the bed of the pickup truck. The rear end of the bin is then lifted by supplying a suitable quantity of compressed air at a sufficient pressure to urge the piston downwardly and thereby pivot the bin about a midpoint and dump the contents of the bin. If the bin has been provided with a gate, the gate is first unfastened so as to permit the cargo to be dumped from the forward end of the bin. After the cargo has been dumped, the compressed air which has been supplied to the piston and cylinder is vented so that the rearward end of the bin may lower. The bin may then be urged forwardly in the bed of the pickup truck and transported or reloaded as desired.

Variations and changes to the present invention will become readily apparent to one skilled in the art upon reading the present specification. Thus, it is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A pneumatically actuated dumping bin for a cargo bed of a vehicle, comprising:
    a bin comprising a floor portion, a left side wall portion, a right side wall portion and a rear wall portion, said bin being adapted to be received within the cargo bed of the vehicle for selective movement while horizontal between a first travel position and a second dumping position, said bin being substantially within said cargo bed of said vehicle when said bin is in the first travel position, and said bin extending substantially beyond a rear end of said cargo bed of said vehicle when said bin is in said second dumping position;
    a pneumatic piston and cylinder, said cylinder being connected to said bin adjacent said rear wall portion with said cylinder being carried by said bin in a substantially vertical orientation while said bin is moved between said first and second positions;
    engagement means for limiting rearward movement of said bin relative to said cargo bed of the vehicle, said engagement means including an engaement member mounted on said bin generally at a midpoint of said bin and means for pivotably engaging said engagement member, said means for pivotably engaging said engagement member including a member mounted at a rearward end of said cargo bed whereby said bin is pivotable generally about a mid-point of said bin when said bin is in said second dumping position;
    compressed air means for selectively actuating said pneumatic piston and cylinder to raise said bin at said rear wall portion when said bin is in said second dumping position;
    a plurality of wheels mounted on the underside of said bin to facilitate said selective movement of the bin between the first travel position and the second dumping position.

2. The apparatus of claim 1, wherein said engagement member comprises a rod member mounted transversely on the underside of said bin and slightly forward of the mid-point of said bin, and wherein said member of said means for pivotably engaging comprises a hook member mounted on said cargo bed of said vehicle at said rearward end of said cargo bed, said rod member being releasably received within said hook member and said bin pivoting about said rod member when said pneumatic piston and cylinder is actuated.

3. The apparatus of claim 2, wherein said plurality of wheels are arranged in rows provided adjacent a rear end of said bin, adjacent to and on both sides of said rod member and adjacent a front end of said bin.

4. The apparatus of claim 1, wherein said rear wall portion of said bin includes a recess with said pneumatic piston and cylinder being received within said recess with said pneumatic piston and cylinder being pivotably connected to said bin at an upper portion of said recess, said pneumatic piston and cylinder being carried by said bin in said substantial vertical orientation while said bin is moved between said first travel position and said second dumping position.

5. The apparatus of claim 4, wherein said recess is located at a mid-section of said rear wall portion.

6. The apparatus of claim 1, wherein said compressed air means includes an electrical air compressor, said electrical air compressor being adapted to be powered by the battery of said vehicle.

7. The apparatus of claim 4, wherein said right side wall portion and said left side wall portion of said bin extend substantially at right angles to said floor portion, said rear wall portion extending at an obtuse angle to said floor portion.

8. The apparatus of claim 7, wherein said rear wall portion extends substantially vertically when said bin is in said second dumping position and said pneumatic piston and cylinder is actuated and when said cargo bed of said vehicle is oriented horizontally.

9. The apparatus of claim 8, wherein said right side wall portion and said left side wall portion of said bin have a reduced height adjacent said rear wall portion of said bin.

10. The apparatus of claim 9, wherein the uppermost edges of the rear wall portion, the left side wall portion and the right side wall portion at the rear end of the bin define a plane which extends substantially perpendicular to said rear wall portion.

11. The apparatus of claim 7, further comprising stop means for limiting a forward movement of said bin in said cargo bed of said vehicle.

12. The apparatus of claim 11, wherein said stop means includes at least one member having an end portion oriented at an angle corresponding to said obtuse angle of said rear wall portion and arranged so as to engage said rear wall portion when said bin is urged forwardly in said bed of said vehicle.

13. The apparatus of claim 1, wherein said bin further comprises a front wall portion.

14. The apparatus of claim 13, wherein said front wall portion includes a gate member selectively removable from said bin.

15. The apparatus of claim 14, wherein said gate member is pivotably mounted on said side wall portions of said bin at an upper end of said gate member.

16. The apparatus of claim 15, wherein said gate member includes left and right pin members which extend longitudinally from the upper end of said gate member, said left and right pin members being rotatably received within said left and right side wall portions of said bin.

17. A pneumatically actuated dumping bin for a cargo bed of a vehicle, comprising:

a bin comprising a floor portion, a front wall portion, a left side wall portion, a right side wall portion and a rear wall portion, said front wall portion including a gate member selectively removable from said bin, said gate member being pivotably mounted on said side wall portions of said bin at an upper end of said gate member, said gate member including left and right pin members which extend longitudinally from the upper end of said gate member, said left and right pin members being rotatably received within said left and right side wall portions of said bin, wherein said left pin member extends beyond the left edge of the gate member and said right pin member extends beyond the right edge of the gate member, said pin members being fixedly mounted on the gate member and wherein said gate member is recessed along a portion of one of said left and right edges at one of said pin members whereby said gate member may be raised and then urged first toward one of said side wall portions and then toward the other of said side wall portions to disengage said pin members from said sidewall portions of said bin, said bin being adapted to be received within the cargo bed of the vehicle for selective movement while horizonal between a first travel position and a second dumping position, said bin being substantially within said cargo bed of said vehicle when said bin is in the first travel position, and said bin extending substantially beyond a rear end of said cargo bed of said vehicle when said bin is in said second dumping position;

a pneumatic piston and cylinder, said cylinder being connected to said bin adjacent said rear wall portion with said cylinder being substantially vertical when said bin is horizontal;

compressed air means for selectively actuating said pneumatic piston and cylinder to raise said bin at said rear wall portion when said bin is in said second dumping position;

a plurality of wheels mounted on the underside of said bin to facilitate said selective movement of the bin between the first travel position and the second dumping position.

18. A pneumatically actuated dumping bin for a cargo bed of a vehicle, comprising:

a bin comprising a floor portion, a left side wall portion, a right side wall portion, a front wall portion and a rear wall portion, said bin being adapted to be received within the cargo bed of the vehicle for selective movement while horizontal between a first travel position and a second dumping position, said bin being completely within said cargo bed of said vehicle when said bin is in the first travel position and said bin extending substantially beyond a rear end of said cargo bed of said vehicle when said bin is in said second dumping position, said front wall portion including a gate member selectively removable from said bin with said gate member being pivotably mounted on said side wall portions of said bin at an upper end of said gate member, and including left and right pin members which extend longitudinally from the upper end of said gate member, said left and right pin members being rotatably received within said left and right sidewall portions of said bin, said gate member being recessed at one of said pin members whereby said gate member may be urged first toward one of said side wall portions and then toward the other of said side wall portions to disengage said pin members from said side wall portions of said bin;

a pneumatic piston and cylinder, said cylinder being pivotably connected to said bin adjacent said rear wall portion, said cylinder being substantially vertical when said bin is horizontal, said rear wall portion of said bin including a recessed portion at a mid-section of said rear wall portion with said pneumatic piston and cylinder being received within said recess with said cylinder being pivotably connected to said bin at an upper portion of said recess;

compressed air means for selectively actuating said pneumatic piston and cylinder to raise said bin at said rear wall portion when said bin is in said second dumping position;

catch means for limiting rearward movement of said bin relative to said cargo bed of the vehicle, said catch means including a rod member mounted transversely on the underside of said bin generally at a mid-point of said bin which rod member is releasably received within a hook member mounted on said cargo bed of said vehicle at a rearward end of said cargo bed, said bin pivoting about said rod member when said bin is in said second dumping position and said pneumatic piston and cylinder is actuated; and a plurality of wheels mounted on the underside of said bin to facilitate said selective movement of the bin between the first travel position and the second dumping position, said plurality of wheels being arranged in rows provided adjacent a rear end of said bin, adjacent to and on both sides of said rod member and adjacent a front end of said bin.

19. A pneumatically actuated dumping bin for a cargo bed of a vehicle, comprising:

a bin comprising a floor portion, a left side wall portion, a right side wall portion, a front wall portion and a rear wall portion, said bin being adapted to be received within the cargo bed of the vehicle for selective movement while horizontal between a first travel position and a second dumping position, said bin being completely within said cargo bed of said vehicle when said bin is in the first travel position and said bin extending substantially beyond a rear end of said cargo bed of said vehicle when said bin is in said second dumping position, said front wall portion including a gate member selectively removable from said bin with said gate member being pivotably mounted on said side wall portions of said bin at an upper end of said gate member, and including left and right pin members which extend longitudinally from the upper end of said gate member, said left and right pin members being rotatably received within said left and right side wall portions of said bin, said gate member being recessed at one of said pin members whereby said gate member may be urged first toward one of said side wall portions and then toward the other of said side wall portions to disengage said pin members from said side wall portions of said bin, said right side wall portion and said left side wall portion of said bin extending substantially at right angles to said floor portion, said rear wall portion extending at an obtuse angle to said floor portion, said right side wall portion and said left side wall portion of said bin having a reduced height adjacent said rear wall portion of said bin, the uppermost edges of the rear wall portion, the left side wall portion and the right side wall portion at the rear end of the bin defining a plane which extends substantially perpendicularly to said rear wall portion;

stop means for limiting forward movement of said bin in said cargo bed of said vehicle, said stop means including at least one member having an end portion oriented at an angle corresponding to said obtuse angle of said rear wall portion and arranged so as to engage said rear wall portion when said bin is urged forwardly in said cargo bed of said vehicle;

a pneumatic piston and cylinder, said pneumatic piston and cylinder being pivotably connected to said bin adjacent said rear wall portion, said pneumatic piston and cylinder being substantially vertical when said bin is horizontal, said rear wall portion of said bin including a recessed portion at a midsection of said rear wall portion with said pneumatic piston and cylinder being received within said recess with said pneumatic piston and cylinder being pivotably connected at a first upper end of said pneumatic piston and cylinder to said bin at an upper portion of said recess and a second lower end of said pneumatic piston and cylinder being unconnected, said rear wall portion of said bin extending substantially vertically when said bin is in said second dumping position and said pneumatic piston and cylinder is actuated and when said cargo bed of said vehicle is oriented horizontally;

compressed air means for selectively actuating said pneumatic piston and cylinder to raise said bin at said rear wall portion when said bin is in said second dumping position, said compressed air means including an electrical air compressor adapted to be powered by the battery of said vehicle;

catch means for limiting rearward movement of said bin relative to said cargo bed of the vehicle, said catch means including a rod member mounted transversely on the underside of said bin forward of a mid-point of said bin which rod member is releasably received within a hook member mounted on said cargo bed of said vehicle at a rearward end of said cargo bed, said bin pivoting about said rod member when said pneumatic piston and cylinder is actuated; and a plurality of wheels mounted on the underside of said bin to facilitate said selected movement of the bin between the first travel position and the second dumping position, said plurality of wheels being arranged in rows provided adjacent a rear end of said bin, adjacent to and on both sides of said rod member and adjacent a front end of said bin.

20. A pneumatically actuated dumping bin for a cargo bed of a vehicle, comprising:

a bin comprising a floor portion, a left side wall portion, a right side wall portion and a rear wall portion, said bin being adapted to be received within the cargo bed of the vehicle for selective movement while horizontal between a first travel position and a second dumping position, said bin being substantially within said cargo bed of said vehicle when said bin is in the first travel position, and said bin extending substantially beyond a rear end of said cargo bed of said vehicle when said bin is in said second dumping position;

pneumatic piston and cylinder, said cylinder being connected to said bin adjacent said rear wall portion with said cylinder being substantially vertical when said bin is horizontal, said pneumatic piston and cylinder being pivotably connected to said bin at a first upper end of said pneumatic piston and cylinder and a second lower end of said pneumatic piston and cylinder being unconnected;

compressed air means for selectively actuating said pneumatic piston and cylinder to raise said bin at said rear wall portion when said bin is in said second dumping position;

a plurality of wheels mounted on the underside of said bin to facilitate said selective movement of the bin between the first travel position and the second dumping position.

21. The apparatus of claim 20 further comprising means for maintaining said second lower end of said pneumatic piston and cylinder in engagement with said cargo bed upon actuation of said pneumatic piston and cylinder.

22. The apparatus of claim 21 wherein said means for maintaining comprises a pad provided at said second lower end of said pneumatic piston and cylinder which frictionally engages said cargo bed upon actuation of said pneumatic piston and cylinder.

23. The apparatus of claim 21 wherein said means for maintaining comprises means for limiting the pivotal movement of said pneumatic piston and cylinder relative to said bin.

24. The apparatus of claim 23 wherein said means for limiting comprises a member which limits pivotal movement of the pneumatic piston and cylinder away from said bin beyond the relative orientation of said pneumatic piston and cylinder with said bin when said pneumatic piston and cylinder is in said substantially vertical orientation.

25. A pneumatically actuated dumping bin for a cargo bed of a vehicle, comprising:

a bin comprising a floor portion, a left side wall portion, a right side wall portion and a rear wall portion, said bin being adapted to be received within the cargo bed of the vehicle for selective movement while horizontal between a first travel position and a second dumping position, said bin being substantially within said cargo bed of said vehicle when said bin is in the first travel position, and said bin extending substantially beyond a rear end of said cargo bed of said vehicle when said bin is in said second dumping position;

a pneumatic piston and cylinder, said cylinder being connected to said bin adjacent said rear wall portion with said cylinder being substantially vertical when said bin is horizontal;

compressed air means for selectively actuating said pneumatic piston and cylinder to raise said bin at said rear wall portion when said bin is in said second dumping position;

a plurality of wheels mounted on the underside of said bin to facilitate said selective movement of the bin between the first travel position and the second dumping position;

said rear wall portion of said bin including a recessed portion with said pneumatic piston and cylinder being received within said recess with said pneumatic piston and cylinder being pivotably connected to said bin at an upper portion of said recess, said pneumatic piston and cylinder being carried by said bin in said substantially vertical orientation while said bin is moved between said first travel position and said second dumping position;

said pneumatic piston and cylinder being pivotably connected to said bin at a first upper end of said pneumatic piston and cylinder and a second lower end of said pneumatic piston and cylinder being unconnected.

26. A pneumatically actuated dumping bin for a cargo bed of a vehicle, comprising:

a bin comprising a floor portion, a left side wall portion, a right side wall portion and a rear wall portion, said bin being adapted to be received within the cargo bed of the vehicle for selective movement while horizontal between a first travel position and a second dumping position, said bin being substantially within said cargo bed of said vehicle when said bin is in the first travel position, and said bin extending substantially beyond a rear end of said cargo bed of said vehicle when said bin is in said second dumping position;

a pneumatic piston and cylinder, said cylinder being connected to said bin adjacent said rear wall portion with said cylinder being substantially vertical when said bin is horizontal;

compressed air means for selectively actuating said pneumatic piston and cylinder to raise said bin at said rear wall portion when said bin is in said second dumping position;

a plurality of wheels mounted on the underside of said bin to facilitate said selective movement of the bin between the first travel position and the second dumping position;

said rear wall portion of said bin including a recessed portion with said pneumatic piston and cylinder being received within said recess with said pneumatic piston and cylinder being pivotably connected to said bin at an upper portion of said recess, said pneumatic piston and cylinder being carried by said bin in said substantial vertical orientation while said bin is moved between said first travel position and said second dumping position;

said pneumatic piston and cylinder being pivotably connected to said bin at a first upper end of said pneumatic piston and cylinder and a second lower end of said pneumatic piston and cylinder being unconnected other than when said bin is in said second dumping position.

27. A bin having a removable gate member, comprising:

a floor portion, a left side wall portion, a right side wall portion, a front wall portion and a rear wall portion, said front wall portion including a gate member selectively removable from said bin with said gate member being pivotably mounted on said side wall portions of said bin at an upper end of said gate member, and including left and right pin members which extend longitudinally from the upper end of said gate member, said left pin member extending beyond the left edge of the gate member and said right pin member exending beyond the right edge of the gate member, said pin members being fixedly mounted on the gate member, said left and right pin members being rotatably received within said left and right sidewall portions of said bin, said gate member being recessed along a portion of one of said left and right edges at one of said pin members whereby said gate member may be urged first toward one of said side wall portions and then toward the other of said side wall portions to disengage said pin members from said sidewall portions of said bin.

* * * * *